April 21, 1936.  N. R. HUGENROTH  2,038,175
FISHING LINE GUIDE
Filed Aug. 8, 1935
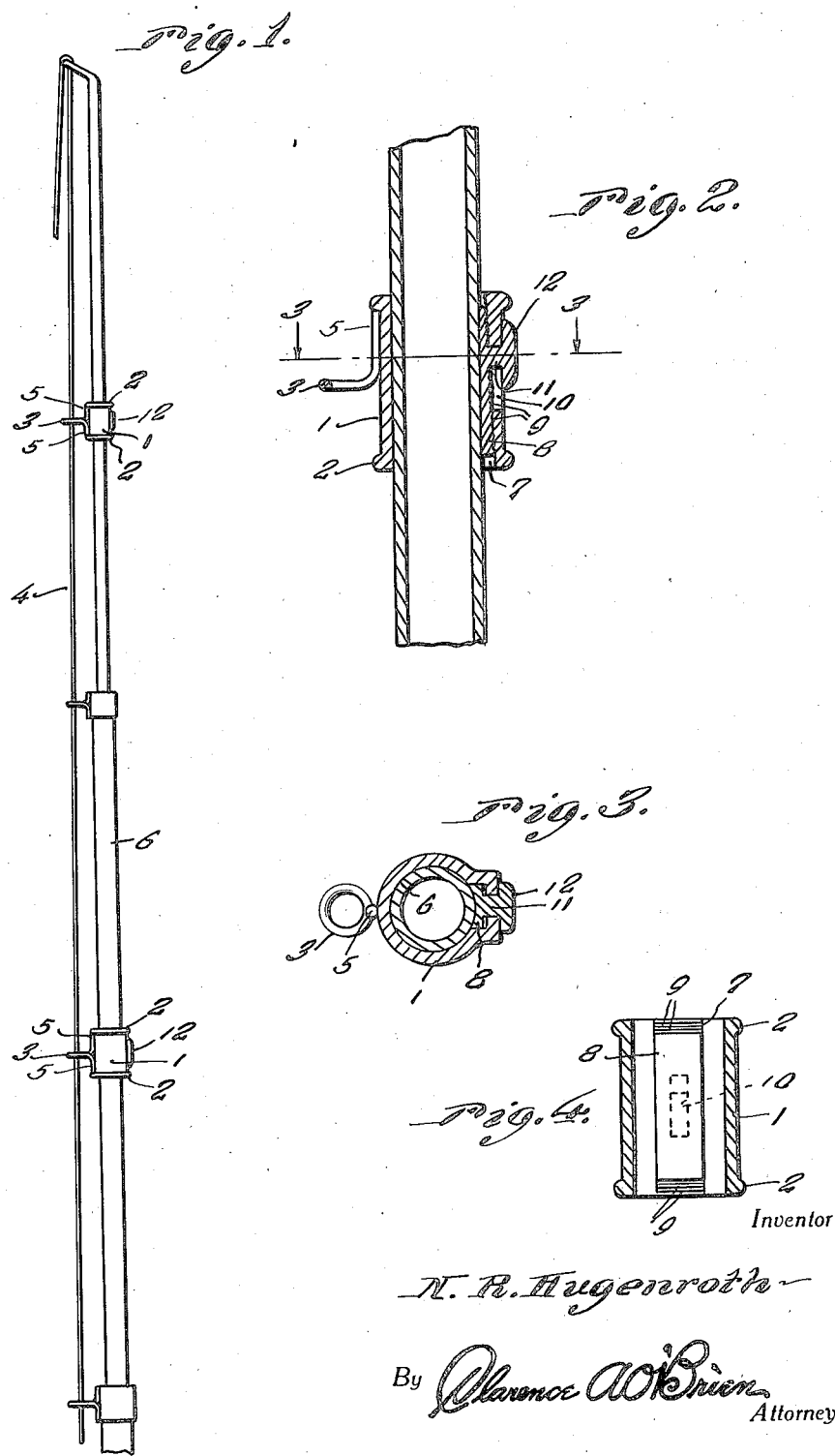
Inventor
N. R. Hugenroth
By Clarence A. O'Brien
Attorney Patented Apr. 21, 1936

2,038,175

UNITED STATES PATENT OFFICE 2,038,175

FISHING LINE GUIDE

Norbert R. Hugenroth, Marquette, Mich.

Application August 8, 1935, Serial No. 35,373

2 Claims. (Cl. 43—24)

The present invention relates to new and useful improvements in fishing line guides for use particularly on telescopic poles and has for one of its important objects to provide, in a manner as hereinafter set forth, a guide which is slidably adjustable on the pole and which includes novel means for securing said guide in adjusted position.

Other objects of the invention are to provide a fishing line guide of the aforementioned character which will be simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1 is a view in side elevation of a telescopic fishing pole equipped with a plurality of guides constructed in accordance with the present invention.

Figure 2 is a view in vertical longitudinal section through the invention and a portion of the pole.

Figure 3 is a cross sectional view, taken substantially on the line 3—3 of Figure 2.

Figure 4 is a view in longitudinal section through the invention.

Referring now to the drawing in detail, it will be seen that the embodiment of the invention which which has been illustrated comprises a substantially tubular sleeve 1 of suitable metal, said sleeve being provided with beads or flanges 2 on its ends. Mounted transversely on the sleeve 1 is an eye 3 for the passage of the fishing line 4. The eye 3 is formed from a single length of wire having an intermediate portion bent in a manner to provide a loop from the end portions 5 which project in opposite directions, said end portions 5 being secured longitudinally in any suitable manner, as by soldering or welding, on the sleeve 1. The sleeve 1 is, of course, adapted to be slipped on the pole 6.

The lower portion of the sleeve 1 is formed to provide an inclined groove 7 for the reception of a locking wedge 8. The locking wedge 8 is slidable in the groove 7 and the bottom of said locking wedge, also the opposed face or wall of the groove 7, are serrated, as at 9, in a manner to releasably secure said locking wedge in operative position. The bottom of the groove 7 has formed therein a longitudinal slot 10 in which a shank 11, which projects from the locking wedge 8, is operable. At its outer end, the shank 11 terminates in a button or head 12.

It is thought that the operation of the device will be readily apparent from a consideration of the foregoing. When it is desired to adjust the guide on the pole 6, the locking wedge is shifted to inoperative position in the groove 7 by engaging a thumb or finger on the button 12 and forcing said locking wedge toward the large or deep end of said groove 7. The sleeve 1 is then shifted to the desired position on the pole, after which the wedge 8 is moved in the opposite direction for frictionally locking said sleeve to the pole. The shank 11 and the button 12 retain the wedge 8 in the groove 7.

It is believed that the many advantages of a fishing line guide constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

1. A fishing line guide comprising a sleeve adapted to be slidably mounted on a pole, an eye mounted on said sleeve for the passage of a line, said eye being formed from a single length of wire having an intermediate portion bent to provide a loop and terminating in oppositely extending end portions secured longitudinally on the sleeve, and means for securing said sleeve in position on the pole, said means including a locking wedge slidably mounted in the sleeve and frictionally engageable with the pole, said sleeve having a longitudinal slot therein, a shank projecting from the wedge and operable in the slot, and a head on the outer end of said shank providing means for manually actuating the wedge.

2. A fishing line guide comprising a sleeve adapted to be slidably adjusted on a fishing pole, an eye mounted on the sleeve for the passage of a fishing line, said sleeve including an internal, inclined groove having a slot therein, a locking wedge operable in the groove and frictionally engageable with the pole for releasably securing the sleeve in adjusted position thereon, a shank projecting from the wedge and operable in the slot, and a button on the outer end of said shank providing means for manually actuating the wedge.

NORBERT R. HUGENROTH.